(12) United States Patent
Magnani

(10) Patent No.: US 9,090,135 B2
(45) Date of Patent: Jul. 28, 2015

(54) DEVICE FOR FITTING AND REMOVING TYRES

(75) Inventor: Franco Magnani, Correggio (IT)

(73) Assignee: M&B ENGINEERING S.R.L., Correggio (RE) (IT)

( * ) Notice: Subject to any disclaimer, the term of this patent is extended or adjusted under 35 U.S.C. 154(b) by 749 days.

(21) Appl. No.: 13/062,407

(22) PCT Filed: Sep. 3, 2009

(86) PCT No.: PCT/IB2009/053839
§ 371 (c)(1),
(2), (4) Date: Mar. 4, 2011

(87) PCT Pub. No.: WO2010/026539
PCT Pub. Date: Mar. 11, 2010

(65) Prior Publication Data
US 2011/0155329 A1 Jun. 30, 2011

(30) Foreign Application Priority Data
Sep. 8, 2008 (IT) .............................. BO2008A0540

(51) Int. Cl.
*B60C 25/135* (2006.01)
*B60C 25/138* (2006.01)
(Continued)

(52) U.S. Cl.
CPC .............. *B60C 25/138* (2013.01); *B60C 25/02* (2013.01); *B60C 25/04* (2013.01); *B60C 25/0578* (2013.04); *B60C 25/132* (2013.01); *B60C 25/025* (2013.01)

(58) Field of Classification Search
CPC ...... B60C 25/04; B60C 25/132; B60C 25/02; B60C 25/025

USPC .............. 157/1.1, 1.22, 1.24, 1.26, 1.28, 1.3, 157/1.33, 1.37, 1.38, 11, 14, 16
See application file for complete search history.

(56) References Cited

U.S. PATENT DOCUMENTS 4,209,053 A * 6/1980 du Quesne ................... 157/1.24
6,182,736 B1 * 2/2001 Cunningham et al. ....... 157/1.24
(Continued)

FOREIGN PATENT DOCUMENTS

| EP | 1593533 A2 | 11/2005 |
| EP | 1714807 A1 | 10/2006 |
| EP | 1944177 A1 | 7/2008 |

OTHER PUBLICATIONS

International Search Report, dated Dec. 21, 2009, from corresponding PCT application.

*Primary Examiner* — Monica Carter
*Assistant Examiner* — Danny Hong
(74) *Attorney, Agent, or Firm* — Young & Thompson

(57) ABSTRACT

A device for fitting and removing tires includes a support having a connecting portion associable with the movable arm of a tire changing machine, a first protruding element associated with the support and suitable to be positioned in correspondence with a section of the edge of a wheel rim, a guide element having a substantially elongated shape and extending substantially orthogonal to the protruding element, a gripping tool associated with the support, suitable to be inserted between the tire and the rim and having a substantially curved end section, the gripping tool being movable between a retracted position, wherein the end section is arranged in proximity of the first protruding element, and an extracted position, wherein the gripping tool extends from the first protruding element towards the wheel. The first protruding element is arranged substantially at the side of the gripping tools, in correspondence with a side of the gripping tool substantially opposite to the guide element.

18 Claims, 5 Drawing Sheets

(51) Int. Cl.
*B60C 25/04* (2006.01)
*B60C 25/02* (2006.01)
*B60C 25/132* (2006.01)
*B60C 25/05* (2006.01)

(56) References Cited

U.S. PATENT DOCUMENTS 6,629,554 B2 * 10/2003 Mimura .................. 157/1.24
7,128,119 B2 * 10/2006 Corghi .................... 157/1.22
7,341,090 B2 * 3/2008 Gonzaga ................. 157/1.17
7,438,109 B2 * 10/2008 Cunningham ........... 157/1.24
7,481,258 B2 * 1/2009 Vignoli ................... 157/1.24
7,743,812 B2 * 6/2010 Sotgiu .................... 157/1.24
8,291,958 B2 * 10/2012 Bartoli ................... 157/1.24
2005/0247409 A1 * 11/2005 Corghi .................... 157/1.22
2008/0163983 A1 * 7/2008 Cunningham ........... 157/1.24
2008/0179014 A1 * 7/2008 Sotgiu ..................... 157/1.3

* cited by examiner

DEVICE FOR FITTING AND REMOVING TYRES

The present invention refers to a device for fitting and removing tyres.

It is known that traditional wheels for vehicles are constituted by a metallic rim on which an elastic tyre is mounted.

In particular, the metallic rim is provided with a housing delimited by two lateral shoulders suitable to hold the beads of the tyre.

The repair and the substitution of tyres are commonly carried out in repair shops or the like and the operations of removing and fitting tyres respectively from/on rims are carried out using appropriate machines, commonly known as "tyre changing machines".

Tyre changing machines of known type comprise, generally, a support structure which extends vertically and which is constituted by a base provided with a self-centering gripping device of the rim of the wheel and by a support upright of one or more movable arms provided with tools suitable for fitting and removing a tyre.

The gripping device, for example, can be constituted of a horizontal plate provided with claws for the blocking of the rim and associated with the base rotatable about a vertical axis through motor means.

The movable arms are suitable, to move the tools horizontally and vertically for the correct placement on the tyre during the removing and fitting operations. Among the tools mounted on the tyre changing machines, a particular tool is commonly used, known as "turret", suitable to facilitate the operations of extraction and insertion of the bead of a tyre to remove or to mount respectively from/on the rim.

Such turret comprises a support portion suitable to be positioned in correspondence with a section of the edge of the rim, in proximity of the bead of the tyre, and a horizontally elongated and substantially curved portion usable in particular to facilitate the fitting operations.

In particular, during the operations of removing a tyre, once the support portion of the turret is positioned in correspondence with a section of the edge of the rim, the manual intervention by an operator through an appropriate lever allows the raising of the bead over the shoulder of the rim and the same turret, and the subsequent rotation of the device for gripping the rim, and therefore of the wheel with respect to the turret, allows the extraction of the bead from the rim along all the circumference.

Moreover, during the fitting operations, the turret can be used to press a section of the tyre under the edge of the rim and, during the subsequent rotation of the device for gripping the rim, the elongated portion guides the insertion of the bead under the edge of the rim along all the circumference.

Nevertheless, such known machines have some drawbacks.

In particular, the use of tools as turrets or the like necessarily requires the manual intervention of the operator, in particular during the operation of removing the tyre from the rim.

In order to obviate such disadvantage it is known the use of tyre changing machines comprising an operating head mounted on a suitable movable arm and suitable to carry out automatically the extraction of the bead of the tyre from the rim.

With reference to a particular typology of such machines, such operating head is provided with a tool substantially hook-shaped and movable between a retracted position and an extracted position.

In particular, subsequently to the positioning of the operating head in proximity of a section of the bead, the tool is moved from the retracted position to the extracted position, thus inserting between such section of the bead and the shoulder of the rim.

Subsequently, the handling of the tools from the extracted position to the retracted position allows the gripping and the extraction of the section of the bead from the rim.

Such machines, however, are susceptible of improvements, in particular to facilitate the correct positioning of the head in correspondence with the bead, prior to the insertion of the tool, and to facilitate the subsequent operations of raising of the bead along all the circumference of the tyre.

Moreover, tyre changing machines are known wherein the operating head is usable for both the separation and the extraction of the bead of the tyre from the rim.

A particular typology of such machines, for example, is provided with a couple of tools, both movable between a first retracted position and a second extracted position.

Once the operating head is positioned in correspondence with the bead, a first tool is moved from the retracted position to the extracted position to separate the bead from the shoulder of the rim and, subsequently, a second tool is moved from the retracted position to the extracted position so as to insert between the section of the bead and the shoulder of the rim and from the extracted position to the retracted position for the gripping and the extraction of such section of the bead.

Even such known machines, however, are not lacking drawbacks, as they result constructively complex and not simple and immediate to use.

Another known solution described in patent n. EP 1 593 533 provides for an operating head for fitting and removing tyres associable with the movable arm of a tyre changing machine and provided with:
- a gripping tool movable between a first retracted position and a second extracted position and suitable to be inserted between the tyre and the rim of a wheel in order to seize and to extract a section of the bead of the tyre;
- a turret constituted of a protruding tooth suitable to be positioned in correspondence with a section of the edge of the rim, in proximity of the bead of the tyre to be extracted, and of a horizontally elongated and substantially curved wing which extends orthogonal to the tooth.

Practically, in such solution, the turret is constituted of a single body provided with the protruding tooth and with the elongated curved wing, while the gripping tool is arranged on a side of the turret, at the side of the protruding tooth.

During the use, the gripping tool is suitable to be shifted with respect to the turret between the retracted position, wherein a curved end section of the tool is arranged aligned with the protruding tooth, and an extracted position, wherein the gripping tool extends downwards from the protruding tooth in order to be inserted between the rim and the tyre of the wheel.

However, also the operating head described in patent n. EP 1 593 533 is not lacking drawbacks.

In particular, the turret is usable exclusively during the operations of fitting a tyre on a rim, while the removing operations are executed by means of the gripping tool.

In particular, during the rotation of the wheel for the extraction of the bead of the tyre along all the perimeter of the rim, the action of traction on the bead is exerted by the gripping tool in the retracted position.

This renders the operating head hardly usable for all typologies of tyres without the use of further tools such as additional rollers or the like and involves, consequently, a greater complexity of the removing operations.

The main task of the present invention is that of devising a device for fitting and removing tyres, which can be mounted on a tyre changing machine, which allows to facilitate the correct positioning of the head in correspondence with the bead, prior to the insertion of the tool, which allows to carry out correctly the subsequent operations of raising the bead along all the circumference of the tyre and, at the same time, that results simple and immediate to use.

A further scope of the present invention is that of devising a device for fitting and removing tyres that can be produced in simple way and with contained costs. The scopes described above are attained by the present device for fitting and removing tyres, comprising a support provided with at least one connecting portion associable with the movable arm of a tyre changing machine, at least a first protruding element associated with said support and suitable to be positioned in correspondence with at least a section of the edge of the rim of a wheel, in proximity of the bead of the tyre, at least a substantially elongated guide element associated with said support and that extends substantially orthogonal with respect to said protruding element, at least a gripping tool associated with said support, suitable to be inserted between the tyre and the rim of said wheel and provided with a substantially curved end section suitable to seize at least a section of the bead of said pneumatic, said gripping tool being suitable to be shifted between a retracted position, wherein said end section is arranged in proximity of said first protruding element, and an extracted position, wherein said gripping tool extends from said first protruding element towards said wheel, characterized in that said first protruding element is arranged substantially at the side of said gripping tool, in correspondence with a side of said gripping tool substantially opposite to said element of guide.

Further characteristics and advantages of the present invention shall be more apparent from the description of two preferred, but not exclusive, embodiments of a device for fitting and removing tyres, illustrated for indicative but non limitative purposes, in the joined tables of designs wherein.

With particular reference to such figures, a device mountable on a tyre changing machine and usable for fitting and removing tyres from rims of wheels for vehicles has been indicated in its entirety with 1.

Figure 1:
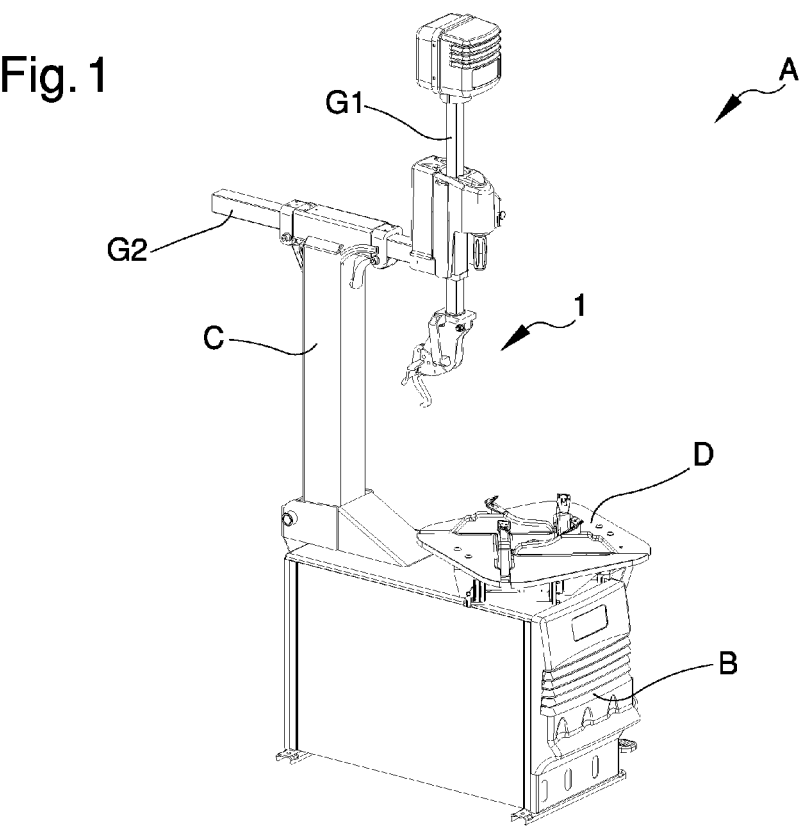
FIG. 1 is an axonometric view of the device according to the invention mounted on a tyre changing machine.

The device 1 is mountable on a conventional tyre changing machine, of the type of the machine illustrated as an example in FIG. 1 and indicated in its entirety with the reference A.

The machine A comprises a bearing structure constituted by a support base B on the ground and by an upright C that extends vertically.

The base B supports a plate D for gripping the rim E of a wheel F, arranged horizontally and provided with self-centering claws for blocking the rim E. Such gripping plate D is associated with the base rotatable about a vertical axis.

The upright C supports a vertically movable arm G1 and a horizontally movable arm G2. The arm G1 is provided with, in correspondence with its lower end, the device 1 usable for fitting and removing the tyre H from the rim E. The device 1, in particular, comprises a support 2 provided with, at one of its ends, a connecting portion 3 suitable to be fixed to the arm G1 of the machine A. The device 1 comprises, moreover, a gripping tool 4 suitable to be inserted between the bead I of the tyre H to be dismounted and the edge L of the rim E and suitable to be used for the extraction of the bead I above such edge L. In particular, the gripping tool 4 has an elongated conformation and is provided with a substantially curved end section suitable to seize a section of the bead I.

Figure 4:
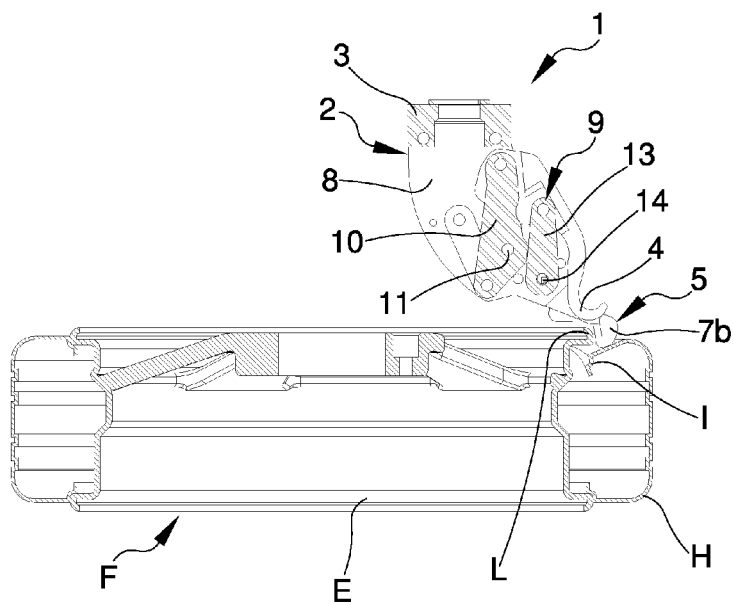
FIG. 4 is a cross-section view along the cross-section plan IV-IV of FIG. 3.
Figure 5:
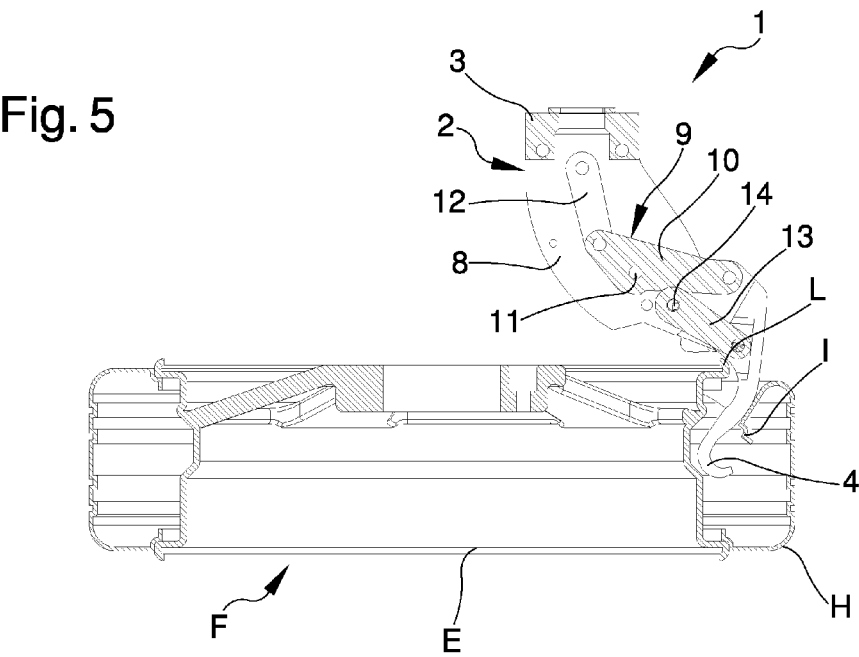
FIG. 5 is a cross-section view of the device according to the invention during the insertion of a gripping tool between the bead of a tyre and the edge of the respective rim.
Figure 6:
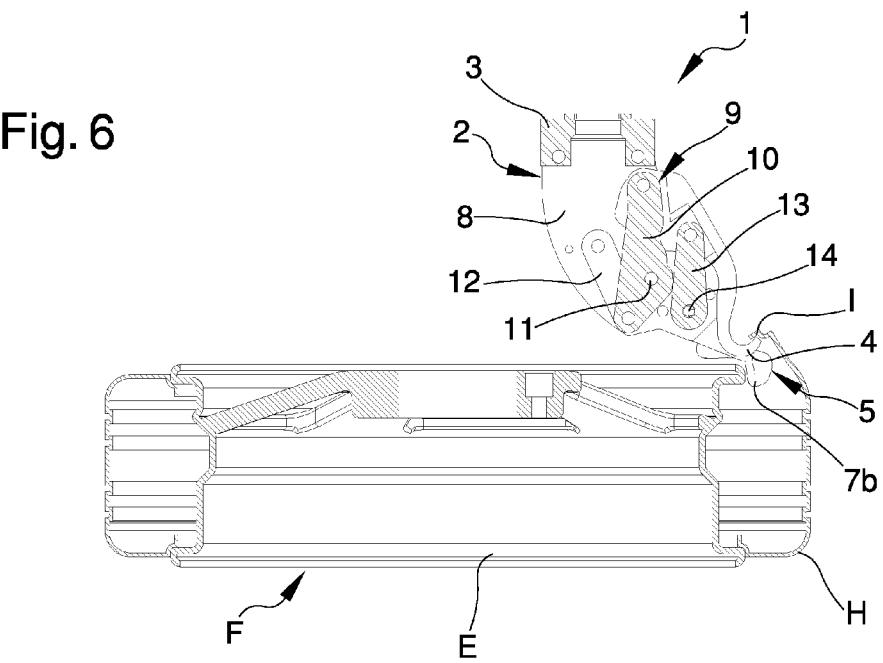
FIG. 6 is a cross-section view of the device according to the invention during the extraction of the bead of a tyre over the edge of the respective rim.

In order to allow the execution of such operation of extraction of bead I, the gripping tool 4 is associated with the support 2 movable between a retracted position, illustrated in FIGS. 4 and 6, wherein it is substantially approached to the support 2, and an extracted position, illustrated in FIG. 5, wherein it is substantially protruding from support 2.

Advantageously, the device 1 comprises extraction and guide means, indicated with reference 5, supported by the support 2 and provided with a first protruding element 7a and a second protruding element 7b, substantially L-shaped, which extends from the support 2 towards the wheel F on opposite sides of the gripping tool 4.

The protruding elements 7a and 7b are suitable to be positioned in correspondence with a section of the edge of the rim E, in proximity of bead I, so as to facilitate the correct positioning of the same device 1 on the wheel F, prior to the operations of removing the tyre H.

Particularly, the gripping tool 4 is associated with the support 2 movable between the retracted position, wherein the curved end section is arranged over the protruding elements 7a and 7b, and the extracted position, wherein the end section extends from the protruding elements 7a and 7b towards the wheel F. The extraction and guide means 5 comprise, moreover, a guide element 6 having an elongated shape, which extends horizontally and laterally with respect to the second protruding element 7b and which is suitable to guide the insertion of the bead I under the edge L of the rim E during the assembly operations. With not exclusive reference to the particular embodiments of the device 1 illustrated in the figures, the support 2 comprises a couple of plates 8 associated integral, distanced and parallel one to each other.

The plates 8 are fixed by means of threaded clamping means on opposite sides of a section of the connecting portion 3 associable with the arm G1 of the machine A.

The plates 8 are profiled substantially elongated and, in correspondence with an end substantially opposite to the connecting portion 3, are provided with the extraction and guide means 5.

However, different conformations of the support 2 with, for example, different number, disposition and shape of the plates 8 are not excluded.

The device 1 comprises means for transforming the motion generated by an actuator into shifting motion of the gripping tool 4 between the aforesaid retracted and extracted positions, indicated in the figures with the reference 9. The aforesaid actuator can be, for example, of the type of a linear actuator mounted on the arm G1 and controlled by means of the suitable user interface of the machine A.

Usefully, the transformation means 9 are constituted of a system of levers, of the type of an articulated quadrilateral, supported between the two plates 8 and interposed during operation between the actuator and the gripping tool 4.

In particular, such system of levers 9 comprises a lever 10 pivoted in correspondence with a first pin 11 fixed between the two plates 8; the lever 10 is hinged, at one end, to a section of the gripping tool opposite to the curved end section and, at the opposite end to a first connecting rod 12 associable with the aforesaid actuator.

The system of levers comprises a second connecting rod 13 pivoted, at an end, on a second pin 14 fixed between two plates 8 and pivoted, at the opposite end, in correspondence with a section of the gripping tool 4 substantially median.

Advantageously, with reference to the particular embodiment of the device 1 illustrated in the figures from 1 to 8, the extraction and guide means 5 comprise a first protruding element 7a and a second protruding element 7b, distanced between them, that extend along a direction substantially orthogonal to the guide element 6, towards the wheel F.

The gripping tool 4, in particular, is arranged between the two protruding elements 7a and 7b and moves between the retracted position and the extracted position parallel to them.

Advantageously, the first protruding element 7a, being arranged on the opposite side of the gripping tool 4 with respect to the guide element 6, exerts a traction on the tyre during the clockwise rotation of the wheel F, to extract the whole bead of the tyre H.

The particular positioning of such first protruding element 7a, therefore, allows to simplify and to carry out more efficiently the operations of removing the tyre H from the rim E.

The guide element 6 extends from one side of one of the plates 8 and is substantially curved. In particular, the guide element 6 extends laterally from the second protruding element 7b and is made integral therewith.

Usefully, the guide element 6 is at least partially profiled to reproduce the profile of a section of the rim in proximity of the bead.

Each of the protruding elements 7a and 7b is provided with a respective connecting bracket 14 suitable to be fixed, respectively, to each of the plates 8 in correspondence with an end substantially opposite with respect to the connecting portion 3.

Usefully, the first protruding element 7a can be provided with a protruding appendix 15 usable as a fulcrum for the manual use of possible lever auxiliary tools.

Figure 9:
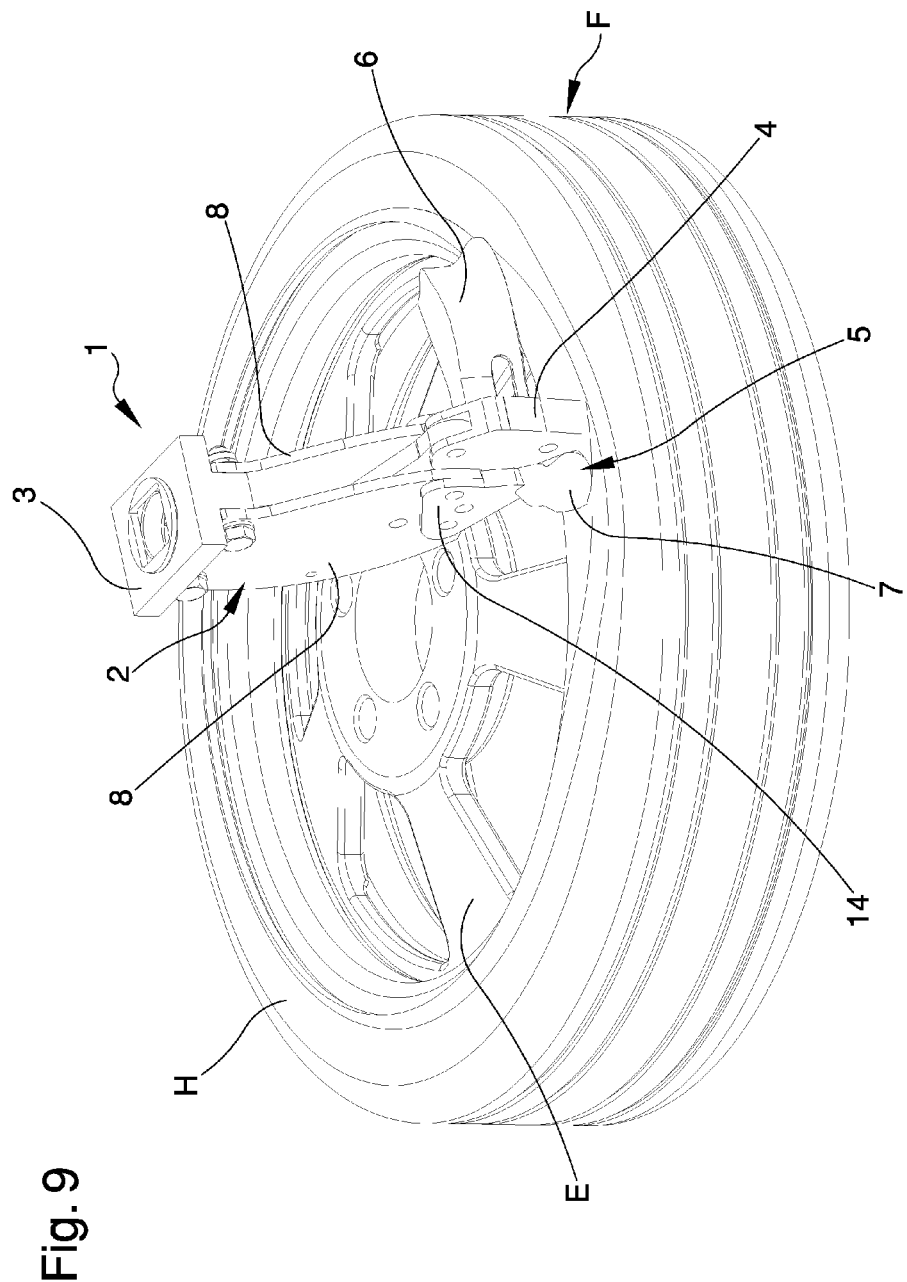
FIG. 9 is an axonometric view of an alternative embodiment of the device according to the invention.

It must be pointed out that different embodiments of the device are not excluded as, for example, the one illustrated in FIG. 9, wherein the extraction and guide means 5 are provided with a single protruding element 7.

In particular, in such second embodiment, the protruding element 7 is fixed to one of the plates 8 and is arranged on the opposite side of the gripping tool 4, with respect to the guide element 6 which is fixed to the other plate 8.

Advantageously, the protruding element 7, being arranged on the opposite side of the gripping tool 4 with respect to the guide element 6, exerts a traction on the tyre during the clockwise rotation of the wheel F to extract the whole bead of the tyre H.

The particular positioning of such protruding element 7, therefore, allows to simplify and to carry out more efficiently the operations of removing the tyre H from the rim E.

The functioning of the device 1 during an operation of removing a tyre is described as follows.

Figure 2:
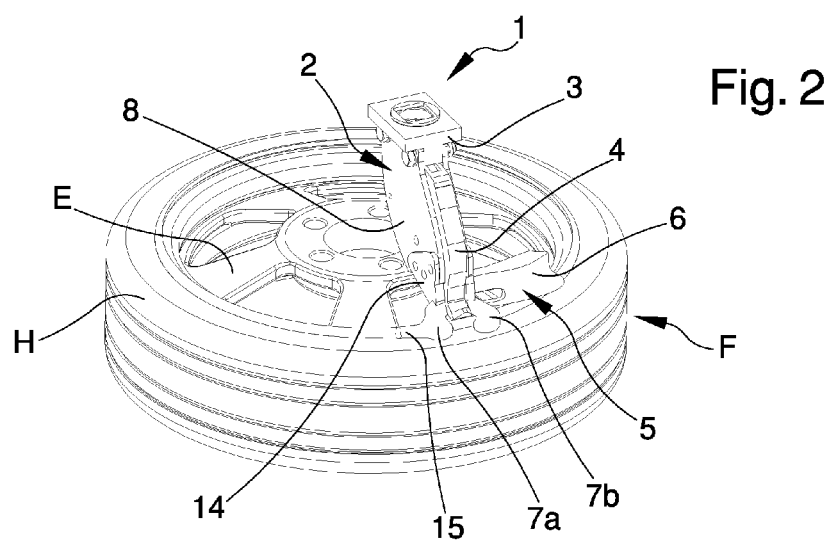
FIG. 2 is an axonometric view of the device according to the invention positioned on the edge of a rim, in correspondence with the bead of a tyre to be extracted.
Figure 3:
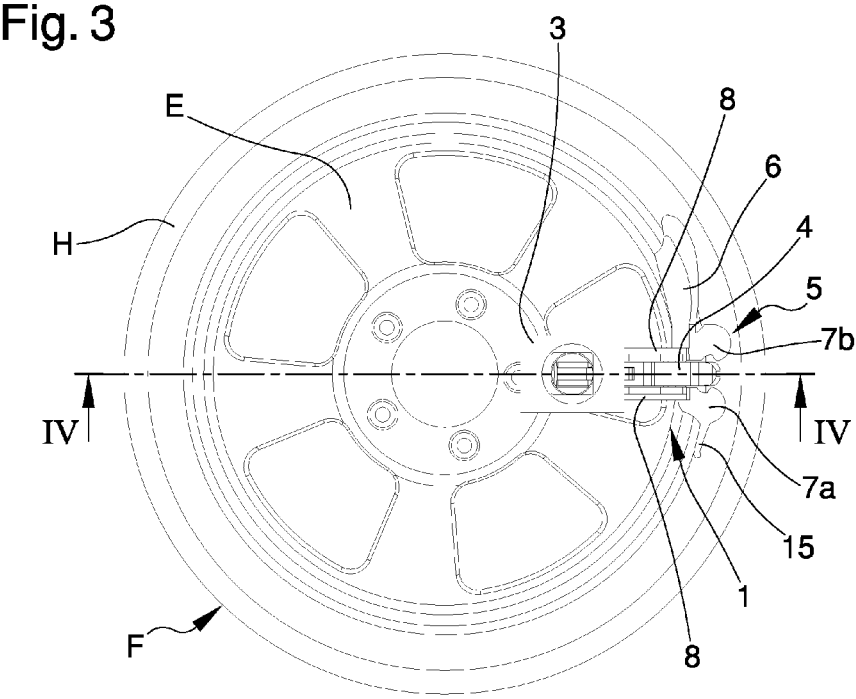
FIG. 3 is a plan view of the device according to the invention positioned on the edge of a rim, in correspondence with the bead of a tyre to be extracted.

Once the rim E of a wheel F with a tyre H to be dismounted is positioned and blocked on the gripping plate D of the machine A, both the arms G1 and G2 are moved to arrange the first protruding element 7a and the second protruding element 7b on the rim E, in proximity of the edge L (FIGS. 2, 3 and 4). Consequently, also the guide element 6 will result arranged in support in correspondence with a section of the rim E.

During such operation the gripping tool 4 is in the retracted position. Successively, the gripping tool 4 is moved by means of the lever system 9 and is carried from the retracted position to the extracted position. The curved end of the gripping tool 4 thus presses on the side of the tyre, to insert between the bead I of the tyre H and the edge L of the rim E (FIG. 5).

Bringing back the gripping tool 4 from the extracted position to the retracted position, the curved end seizes the bead I and brings it over the edge L and over the protruding elements 7a and 7b (FIG. 6).

At this point, rotating the gripping plate D and therefore the wheel F, the action of traction exerted by the curved section of the gripping tool and by the protruding elements 7a and 7b allows the extraction of the bead I from the rim E along all the perimeter.

In particular, the wheel F turns clockwise and the action of traction on the raised section of the bead I is exerted mainly by the first protruding element 7a that, being arranged on the opposite side of the gripping tool 4 with respect to the guide element 6, supports a section of the bead I already extracted from the edge L of the rim E during the rotation of the wheel F.

The particular positioning of such first protruding element 7a, therefore, allows to simplify and to carry out more efficiently the operations of removing the tyre H from the rim E, rendering the use of additional tools unnecessary.

Advantageously, the device 1 is also usable during the operations of fitting a tyre H on a rim E.

In particular, successively to the positioning of the tyre H to be mounted on a rim E, the gripping plate D is rotated and the protruding elements 7a and 7b are positioned in correspondence with a section of the bead of the tyre H and are used in order to press and to maintain such section of the bead under the edge of the rim E.

Moreover, during such rotation, the guide element 6 is positioned along a section of the edge of the rim E and is suitable to guide the insertion of the bead I under the edge L along all the perimeter of the rim E.

Advantageously, during the fitting operation the gripping tool 4 can be positioned in a substantially intermediate position between the retracted and extracted positions.

Figure 7:
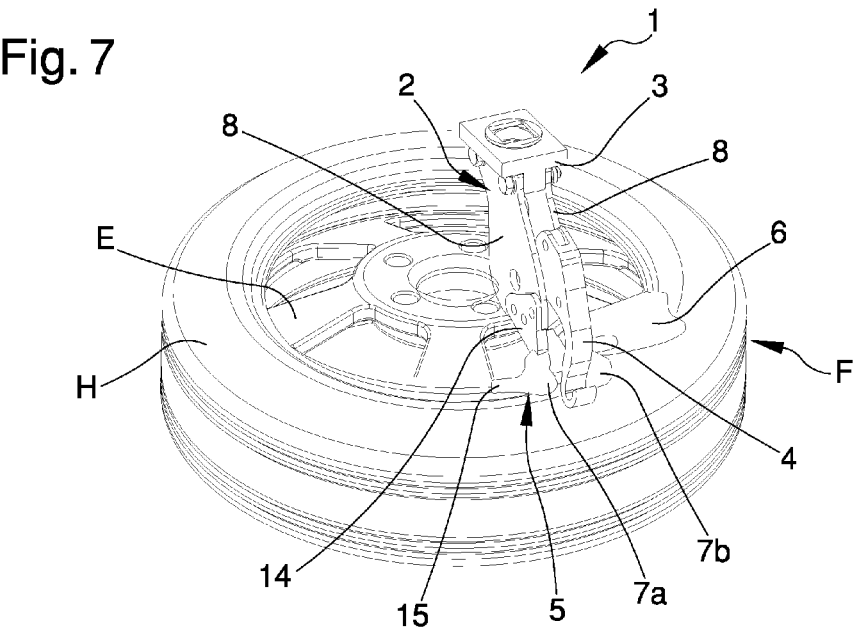
FIG. 7 is an axonometric view of the device according to the invention during the fitting of a tyre on a rim.
Figure 8:
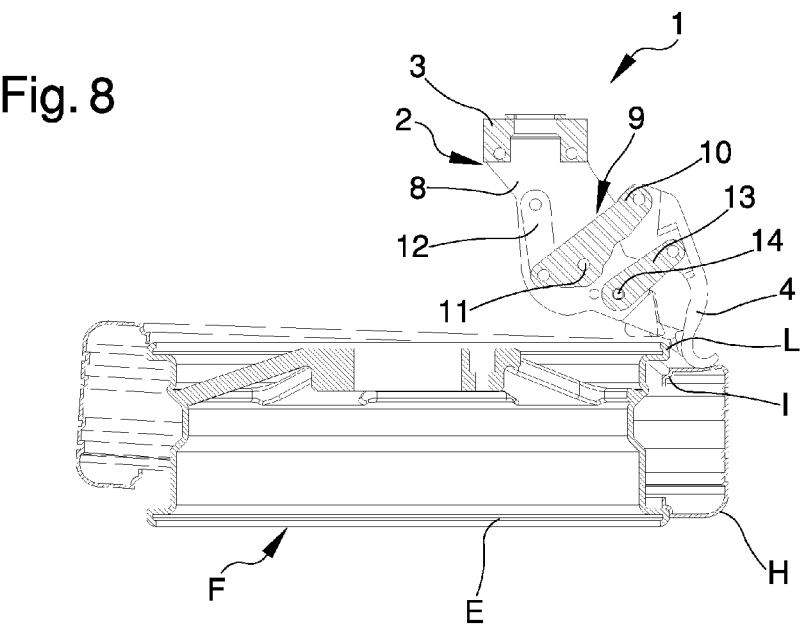
FIG. 8 is a cross-section view of the device according to the invention during the fitting of a tyre on a rim.

In such position, the gripping tool 4 operates jointly to the protruding elements 7a and 7b in order to maintain the bead of the tyre H under the same elements 7a and 7b and the edge of the rim E during the rotation of the wheel F (FIGS. 7 and 8).

With reference to the particular solution illustrated in FIG. 9, the functioning of the device 1 is analogous to the one described above.

In particular, in such case the protruding element 7 is usable both during the removing operations and during the operations of fitting the tyre H from/on the rim E, likewise to what is described above for the first protruding element 7a.

Practically, it has been stated how the described invention attains the proposed scopes, and in particular is must be pointed out that the presence of the gripping tool, together with the presence of the extraction and guide means described above, allows to facilitate the correct positioning of the head in correspondence with the bead, prior to the insertion of the tools, and allows to carry out in a correct way the successive operations of raising the bead along all the circumference of the tyre resulting, in the same time, of simple and immediate use.

In particular, the described invention is usable in simple and effective way both for the operations of fitting a tyre on a rim of a wheel and for the operations of removing the tyre from the rim, without the aid of further tools.

The invention claimed is:

1. A device (1) for fitting and removing tyres, comprising:
   a support (2) provided with at least one connecting portion (3) associable with a movable arm (G1) of a tyre changing machine (A),
   a first protruding element (7a) associated with said support (2) and suitable to be positioned in correspondence with at least a section of the edge of the rim (E) of a wheel (F) so as to facilitate correct positioning of said device (1) on the wheel (F), prior to operations of removing the tyre, close to the bead (I) of the tyre (H), said first protruding element (7a) extending from said support (2) towards the rim (E),
   at least one guide element (6) having a substantially elongated shape associated with said support (2), and which at least one guide element (6) extends substantially orthogonal to said protruding element (7a),
   at least one gripping tool (4), associated with said support (2), suitable to be inserted between the tyre (H) and the rim (E) of said wheel (F) and having a terminal substantially curved end section that, in use, seizes a section of the bead (I),
   said gripping tool (4) being movable with respect to the first protruding element between:
   i) a retracted position, wherein said terminal substantially curved end section is arranged in proximity of said first protruding element (7a), and
   ii) an extracted position, wherein said gripping tool (4) extends from said first protruding element (7a) towards said wheel (F), and
   wherein said first protruding element (7a) is arranged substantially at a first side of said gripping tool (4), and said guide element (6) is arranged on an opposite, second side of said gripping tool (4) such that said gripping tool including the terminal substantially curved end section of said gripping tool separates the first protruding element (7a) from the guide element (6), where the first protruding element (7a) being arranged on the opposite side of the gripping tool (4) with respect to the guide element (6), exerts a traction on the tyre during clockwise rotation of the wheel, to extract the whole bead of the tyre.

2. The device (1) according to claim 1, further comprising at least a second protruding element (7b) associated with said support (2) and the terminal substantially curved end section, and arranged on the second side of said gripping tool (4) such that said gripping tool (4) and the terminal substantially curved end section is arranged between said first protruding element (7a) and said second protruding element (7b),
   wherein the gripping tool (4) is associated with the support (2) movable with respect to the first and second protruding elements (7a, 7b) between i) the retracted position, wherein the terminal substantially curved end section is arranged over the first and second protruding elements (7a,7b), and ii) the extracted position, wherein the terminal substantially curved end section extends from the first and second protruding elements (7a, 7b) towards the wheel (F), and wherein, the second protruding element (7b) and the guide element (2) are both on the same second side of the said gripping tool (4).

3. The device (1) according to claim 1, wherein said guide element (6) extends from one side of said support (2).

4. The device (1) according to claim 2, wherein said second protruding element (7b) and said guide element (6) are integral.

5. The device (1) according to claim 2, wherein at least either said first protruding element (7a) or said second protruding element (7b) is substantially L-shaped.

6. The device (1) according to claim 1, wherein said guide element (6) is substantially curved.

7. The device (1) according to claim 1, wherein said guide element (6) is at least partially profiled to reproduce the profile of at least a section of said rim (E) in proximity of said bead (I).

8. The device (1) according to claim 1, further comprising:
   an actuator; and
   a unit (9) that transforms motion generated by the actuator into a shifting motion of said gripping tool (4) between said retracted position and said extracted position.

9. The device (1) according to claim 8, wherein said unit (9) is a system of levers (9) supported by said support (2) and associated with said actuator and said gripping tool (4).

10. The device (1) according to claim 9, wherein said system of levers (9) is of the type of an articulated quadrilateral.

11. The device (1) according to claim 1, wherein said support (2) comprises at least a plate (8) provided, at an extremity, with said connecting portion (3) and with which are associated, at a substantially opposite end, said guide element (6).

12. The device (1) according to claim 11, wherein said support (2) comprises at least a couple of plates (8) associated integral, distanced and substantially parallel one to each other.

13. The device (1) according to claim 2, wherein at least either said first protruding element (7a) or said second protruding element (7b) is provided with at least a connecting bracket (14) associable integral with said plate (8).

14. The device (1) according to claim 2, wherein said guide element (6) extends laterally from said second protruding element (7b).

15. The device (1) according to claim 12, wherein said system of levers (9) is arranged between said couple of plates (8).

16. A device (1) for fitting and removing a tyre from a rim of a wheel, comprising:
   a bearing structure constituted by a support base (B) that is positioned on a ground surface and by an upright (C) that extends vertically;
   a plate (D) supported by the support base (B) and rotatable about a vertical axis, the plate (D) configured to grip the rim (E) of the wheel (That the plate (D) being arranged horizontally and provided with self-centering claws for blocking the rim (E);
   a vertically movable arm (G1) attached to the upright (C);
   a support (2) having a first end provided with a connecting portion (3) fixed to a bottom end of the movable arm (G1), and a second end provided with a gripping tool (4) insertable between i) a bead (I) of the tyre (H) to be removed and ii) an edge (L) of the rim (E), and suitable to extract the bead (I) above the edge (L), wherein the gripping tool (4) has an elongated conformation and is provided with a terminal substantially curved end section that, in use, seizes a section of the bead (I); and an extraction and guide unit (5), supported by the support (2), said extraction and guide unit (5) comprising i) a first protruding element (7a), ii) a second protruding element (7b), the first and second protruding elements (7a, 7b) extending from the support (2) towards the wheel (F) respectively on opposite first and second sides of the gripping tool (4), and iii) a guide element (6) having an elongated shape, located on the second side of the gripping tool (4) extending horizontally and laterally with respect to the second protruding element (7b) and extending substantially orthogonal to said first protruding element (7a) such that said gripping tool, including the terminal substantially curved end section of said gripping tool, separates the first protruding element (7a) and the guide element (6) with both the guide element (6) and the second protruding element (7b) being on the same second side of the gripping tool including the terminal substantially curved end section of said gripping tool, the guide element (6) being suitable to guide insertion of the bead (i) under the edge (L) of the rim (E) during assembly operations, wherein the first and second protruding elements (7a, 7b) are positionable in correspondence with a section of the edge of the rim (E), in proximity of the bead (I), to facilitate correct positioning of the device (1) on the wheel (F) prior to operations of removing the tyre (H), and wherein said gripping tool (4) is movable with respect to the first and second protruding elements (7a, 7b) between i) the retracted position with said terminal substantially curved end section arranged in proximity over said first and second protruding elements (7a, 7b), and ii) the extracted position with said gripping tool (4) extended from said first and second protruding elements (7a, 7b) towards said wheel (F) with said terminal substantially curved end section extended from the first and second protruding elements (7a, 7b) towards said wheel (F), and wherein the first protruding element (7a) being arranged on the opposite side of the gripping tool (4) with respect to the guide element (6), exerts a traction on the tyre during clockwise rotation of the wheel, to extract the whole bead of the tyre.

17. A device (1) for fitting and removing a tyre from a rim, comprising:

a support (2) having a first end fixable to a movable arm (G1) of a tyre changing machine (A), and a second end provided with a gripping tool (4), the gripping tool (4) insertable between i) a bead (I) of the tyre (H) to be removed and ii) an edge (L) of the rim (E) and suitable to extract the bead (I) above the edge (L), wherein the gripping tool (4) is provided, at a terminal distal end, with a substantially curved end section that in use seizes a section of the bead (I); and an extraction and guide unit (5) supported by the support (2), said extraction and guide unit (5) comprising i) a first protruding element (7a), the first protruding element (7a) being located on a first side of the gripping tool (4) and extending from the support (2) towards the wheel (F), and ii) a guide element (6) having an elongated shape, located on an opposite, second side of the gripping tool (4) extending substantially orthogonal to said first protruding element (7a), the guide element (6) being suitable to guide insertion of the bead (i) under the edge (L) of the rim (E) during assembly operations, the first protruding element (7a) and the guide element being separated by the gripping tool (4) and the substantially curved end section, wherein the first protruding element (7a) is positionable in correspondence with a section of the edge of the rim (E), in proximity of the bead (I), to facilitate correct positioning of the device (1) on the wheel (F) prior to operations of removing the tyre (H), wherein said gripping tool (4) is movable with respect to the first protruding element (7a) between i) the retracted position with said terminal substantially curved end section arranged in proximity over said first protruding element (7a), and ii) the extracted position with said gripping tool (4) extended from said first protruding element (7a) towards said wheel (F), wherein the first protruding element (7a) being arranged on the opposite side of the gripping tool (4) with respect to the guide element (6), exerts a traction on the tyre during clockwise rotation of the wheel, to extract the whole bead of the tyre.

18. A device (1) of claim 17, further comprising a second protruding element (7b), the second protruding element (7b) extending from the support (2) towards the wheel (F) respectively on the second side of the gripping tool (4), such that the guide element (6) extends horizontally and laterally with respect to the second protruding element (7b), wherein the first and second protruding elements (7a, 7b) are positionable in correspondence with the section of the edge of the rim (E), in proximity of the bead (I), to facilitate correct positioning of the device (1) on the wheel (F) prior to the operations of removing the tyre (H), wherein said gripping tool (4) is movable with respect to the first and second protruding elements (7a, 7b) between i) the retracted position with said substantially curved end section arranged in proximity over said first and second protruding elements (7a, 7b), and ii) the extracted position with said gripping tool (4) extended from said first and second protruding elements (7a, 7b) towards said wheel (F) and with the substantially curved end section extended from the first and second protruding elements (7a, 7b) towards the wheel (F).

\* \* \* \* \*